United States Patent
Myasnikov et al.

(10) Patent No.: US 7,431,756 B2
(45) Date of Patent: Oct. 7, 2008

(54) MODULAR METAL HYDRIDE HYDROGEN STORAGE SYSTEM

(75) Inventors: Vitaliy Myasnikov, West Bloomfield, MI (US); Alexandr Gerasimov, West Bloomfield, MI (US); Valeriy Sobolev, Waterford, MI (US)

(73) Assignee: Ovonic Hydrogen Systems LLC, Rochester Hills, MI (US)

( * ) Notice: Subject to any disclaimer, the term of this patent is extended or adjusted under 35 U.S.C. 154(b) by 487 days.

(21) Appl. No.: 11/138,864

(22) Filed: May 26, 2005

(65) Prior Publication Data

US 2005/0211573 A1 Sep. 29, 2005

Related U.S. Application Data

(63) Continuation-in-part of application No. 10/716,220, filed on Nov. 18, 2003, now abandoned, which is a continuation of application No. 10/173,381, filed on Jun. 17, 2002, now Pat. No. 6,708,546, which is a continuation-in-part of application No. 10/143,243, filed on May 9, 2002, now Pat. No. 6,709,497.

(51) Int. Cl.
*F17C 11/00* (2006.01)

(52) U.S. Cl. .............................. 96/126; 96/154; 206/0.7

(58) Field of Classification Search ................. 423/248, 423/648.1; 420/900; 206/0.7; 502/526; 96/108, 121, 126, 146, 154

See application file for complete search history.

(56) References Cited

U.S. PATENT DOCUMENTS

| 4,165,569 | A | * | 8/1979 | Mackay | 34/416 |
| 4,187,092 | A | * | 2/1980 | Woolley | 62/46.2 |
| 4,457,136 | A | * | 7/1984 | Nishizaki et al. | 62/46.2 |
| 4,609,038 | A | * | 9/1986 | Ishikawa et al. | 165/104.12 |
| 4,667,815 | A | * | 5/1987 | Halene | 206/0.7 |
| 4,905,856 | A | * | 3/1990 | Krogager | 220/588 |
| 6,015,041 | A | * | 1/2000 | Heung | 206/70 |
| 6,626,323 | B2 | * | 9/2003 | Stetson et al. | 220/577 |
| 6,709,497 | B2 | * | 3/2004 | Myasnikov et al. | 96/126 |
| 2002/0100369 | A1 | * | 8/2002 | Kuriiwa et al. | 96/146 |
| 2005/0188847 | A1 | * | 9/2005 | Fujita et al. | 96/126 |

FOREIGN PATENT DOCUMENTS

| JP | 62-288495 A | * | 12/1987 |
| JP | 63-035401 A | * | 2/1988 |
| JP | 05-106792 A | * | 4/1993 |

* cited by examiner

*Primary Examiner*—Frank M. Lawrence
(74) *Attorney, Agent, or Firm*—David W. Schumaker

(57) ABSTRACT

A modular metal hydride hydrogen storage unit utilizing compartmentalization to maintain a uniform metal hydride powder density thereby reducing strain on the vessel due to repeated cycling. The modular metal hydride hydrogen storage unit may be constructed using prefabricated pressure containment vessels.

17 Claims, 3 Drawing Sheets

MODULAR METAL HYDRIDE HYDROGEN STORAGE SYSTEM

CROSS REFERENCE TO RELATED APPLICATIONS

The present application is a continuation-in-part of, and is entitled to the benefit of the earlier filing date and priority of, U.S. patent application Ser. No. 10/716,220, now abandoned which is assigned to the same assignee as the current application, entitled "HONEYCOMB HYDROGEN STORAGE STRUCTURE WITH RESTRICTIVE NECK," filed Nov. 18, 2003 for Myasnikov et al., the disclosure of which is hereby incorporated by reference which is a continuation of U.S. patent application Ser. No. 10/173,381, filed Jun. 17, 2002, now U.S. Pat. No. 6,708,546, which is a continuation-in-part of U.S. patent application Ser. No. 10/143,243, filed May 9, 2002, now U.S. Pat. No. 6,709,497.

FIELD OF THE INVENTION

The present invention generally relates to hydrogen storage systems. More particularly, the present invention relates to hydrogen storage systems utilizing a hydrogen storage alloy to store hydrogen in metal hydride form.

BACKGROUND

In the past considerable attention has been given to the use of hydrogen as a fuel or fuel supplement. While the world's oil reserves are rapidly being depleted, the supply of hydrogen remains virtually unlimited. Hydrogen can be produced from coal, natural gas and other hydrocarbons, or formed by the electrolysis of water. Moreover hydrogen can be produced without the use of fossil fuels, such as by the electrolysis of water using renewable energy. Furthermore, hydrogen, although presently more expensive than petroleum, is a relatively low cost fuel. Hydrogen has the highest density of energy per unit weight of any chemical fuel and is essentially non-polluting since the main by-product of burning hydrogen is water.

While hydrogen has wide potential application as a fuel, a major drawback in its utilization, especially in mobile uses such as the powering of vehicles, has been the lack of acceptable hydrogen storage medium. Conventionally, hydrogen has been stored in a pressure vessel under a high pressure or stored as a cryogenic liquid, being cooled to an extremely low temperature. Storage of hydrogen as a compressed gas involves the use of large and bulky vessels.

Additionally, transfer is very difficult, since the hydrogen is stored in a large-sized vessel; amount of hydrogen stored in a vessel is limited, due to low density of hydrogen. Furthermore, storage as a liquid presents a serious safety problem when used as a fuel for motor vehicles since hydrogen is extremely flammable. Liquid hydrogen also must be kept extremely cold, below −253° C., and is highly volatile if spilled. Moreover, liquid hydrogen is expensive to produce and the energy necessary for the liquefaction process is a major fraction of the energy that can be generated by burning the hydrogen.

Alternatively, certain metals and alloys have been known to permit reversible storage and release of hydrogen. In this regard, they have been considered as a superior hydrogen-storage material, due to their high hydrogen-storage efficiency. Storage of hydrogen as a solid hydride can provide a greater volumetric storage density than storage as a compressed gas or a liquid in pressure tanks. Also, hydrogen storage in a solid hydride presents fewer safety problems than those caused by hydrogen stored in containers as a gas or a liquid. Solid-phase metal or alloy system can store large amounts of hydrogen by absorbing hydrogen with a high density and by forming a metal hydride under a specific temperature/pressure or electrochemical conditions, and hydrogen can be released by changing these conditions. Metal hydride systems have the advantage of high-density hydrogen-storage for long periods of time, since they are formed by the insertion of hydrogen atoms to the crystal lattice of a metal. A desirable hydrogen storage material must have a high gravimetric and volumetric density, a suitable absorption/desorption temperature/pressure, good kinetics, good reversibility, resistance to poisoning by contaminants including those present in the hydrogen gas and be of a relatively low cost. If the material fails to possess any one of these characteristics it will not be acceptable for wide scale commercial utilization.

Good reversibility is needed to enable the hydrogen storage material to be capable of repeated absorption-desorption cycles without significant loss of its hydrogen storage capabilities. Good kinetics are necessary to enable hydrogen to be absorbed or desorbed in a relatively short period of time. Resistance to contaminants to which the material may be subjected during manufacturing and utilization is required to prevent a degradation of acceptable performance.

Heat transfer capability can enhance or inhibit efficient exchange of hydrogen into and out of hydrogen storage metal alloys used in hydride storage systems. During hydriding of the hydrogen storage alloy an exothermic reaction occurs whereby hydrogen is absorbed into the hydrogen storage alloy and during dehydriding of the hydrogen storage alloy an endothermic reaction occurs whereby hydrogen is desorbed from the hydrogen storage alloy. In many instances, heat transfer within the hydrogen storage alloy utilized in the hydrogen storage systems cannot be relied upon for effective heat transfer within the hydrogen storage system since metal hydrides, in their hydrided state, being somewhat analogous to metal oxides, borides, and nitrides ("ceramics"), may be considered to be generally insulating materials. Therefore, moving heat within such systems or maintaining preferred temperature profiles across and through volumes of such storage materials becomes a crucial factor in metal alloy-metal hydride hydrogen storage systems. As a general matter, release of hydrogen from the crystal structure of a metal hydride requires input of some level of energy, normally heat. Placement of hydrogen within the crystal structure of a metal, metal alloy, or other storage system generally releases energy, normally heat, providing a highly exothermic reaction of hydriding or placing hydrogen atoms within the crystal structure of the hydrideable alloy.

The heat released from hydrogenation of hydrogen storage alloys must be removed. Heat ineffectively removed can cause the hydriding process to slow down or terminate. This becomes a serious problem which prevents fast charging. During fast charging, the hydrogen storage alloy is quickly hydrogenated and considerable amounts of heat are produced. The present invention provides for effective removal of the heat caused by the hydrogenation of the hydrogen storage alloys to facilitate fast charging of the hydride material.

Due to the heat input and heat dissipation needs of such systems, particularly in bulk, and in consideration of the insulating nature of the hydrided material, it is useful to provide means of heat transfer external to the storage material itself. Others have approached this in different ways, one by inclusion of a metal-bristled brush or brush-like structure within the hydrogen storage alloy, depending upon the metal bristles to serve as pathways for effective heat transfer. Another has developed a heat-conductive reticulated open-celled "foam" into which the hydrided or hydrideable material is placed.

Another recognized difficulty with hydride storage materials is that as the hydrogen storage alloy is hydrided, it will generally expand and the particles of storage material will swell and, often crack. When hydrogen is released, generally on application of heat, the storage material or hydrided material will shrink and some particles may collapse. The net effect of the cycle of repeated expansion and contraction of the storage material is comminution of the alloy or hydrided alloy particles into successively finer grains. While this process may be generally beneficial to the enhancement of overall surface area of the alloy or storage material surface area, it creates the possibility that the extremely fine particles may sift through the bulk material and settle toward the lower regions of their container or shift by gas flow and pack more tightly than is desirable. The highly packed localized high density region may produce a great amount of strain on the vessel due to the densification and expansion (upon charging) of the hydrogen storage material. The densification and expansion of the hydrogen storage material provide the possibility of deformation, cracking, or rupture of the container in which the hydrideable material is stored. While pressure relief devices may be useful in preventing such undesired occurrences as the container rupture due to the internal gas pressure of the vessel, pressure relief devices are unable to prevent deformation of the vessel resulting from densification and expansion of the hydrogen storage alloy. Others have approached the problem by dividing the container into simple compartments in a manner that prevents collection of too many fines in a particular compartment while allowing free flow of hydrogen gas throughout the container.

While including heat transfer and/or compartmentalization structures in a metal hydride hydrogen storage system has many benefits, the inclusion of such structures is not without problems. The heat transfer and/or compartmentalization structures, due to their size with respect to allowable vessel openings, can be difficult to properly position into prefabricated seamless pressure containment vessels. As such, prefabricated vessels are not typically utilized for hydrogen storage units containing such structures. A two piece pressure containment vessel may be used to house the hydrogen storage alloy, however, after the heat transfer/compartmentalization structures are placed inside the two pieces and the two pieces are welded together to form the vessel, a seam is formed which may provide weakness to the vessel structure. To place the heat transfer/compartmentalization structures within a seamless pressure containment vessel, a pressure containment vessel may be formed around the heat transfer/compartmentalization structures utilizing a spinning process, but this process can be timely and may increase the production cost of the system. The ability to purchase prefabricated pressure containment vessels in bulk then place the heat transfer/compartmentalization structures within the prefabricated vessels can be a cost effective way of constructing metal hydride hydrogen storage units and is highly desirable.

SUMMARY OF THE INVENTION

Disclosed herein, is a metal hydride hydrogen storage unit comprising a pressure containment vessel having a longitudinal axis, a plurality of cells at least partially filled with a hydrogen storage alloy, a plurality of primary modular blocks containing at least a portion of the plurality of cells, and a plurality of fins wherein each of the fins are disposed between two of the primary modular blocks. The plurality of modular blocks and/or the plurality of fins may be radially disposed inside the pressure containment vessel about the longitudinal axis of the pressure containment vessel. The plurality of fins may have a corrugated or grooved configuration. The plurality of cells may have an open top, an open bottom, and a cell wall. The hydrogen storage material may be retained in the plurality of cells via a porous filter material disposed at the top and/or bottom of each of the plurality of cells. The plurality of cells may have a circular configuration or a polygonal configuration. The primary modular blocks preferably have a height less than one half of the inner diameter of the pressure containment vessel. The pressure containment vessel may be wrapped in a fiber reinforced composite material.

The metal hydride hydrogen storage unit may further comprise one or more heat exchanger tubes at least partially disposed within the pressure containment vessel, the one or more heat exchanger tubes being in thermal communication with the hydrogen storage material.

The metal hydride hydrogen storage unit may further comprise an axial channel disposed about the longitudinal axis of the pressure containment vessel. One or more secondary blocks including at least a portion of the plurality of cells may be disposed in the axial channel. The one or more secondary modular blocks may have a cylindrical configuration.

DETAILED DESCRIPTION OF THE PREFERRED EMBODIMENTS OF THE INVENTION

In accordance with the present invention there is provided herein a modular metal hydride hydrogen storage unit. Through compartmentalization, the metal hydride hydrogen storage unit maintains a substantially uniform metal hydride powder density after repeated cycling. The design of the metal hydride hydrogen storage unit reduces the amount of strain applied on the interior of the hydrogen storage unit as a result of the expansion of the hydrogen storage material upon absorbing and storing hydrogen in metal hydride form. The metal hydride hydrogen storage unit may also be able to absorb a portion of the stress created by the expansion of the hydrogen storage material thereby further reducing the strain applied on interior of the hydrogen storage unit. The modular design of the metal hydride hydrogen storage unit also allows for assembly of the hydrogen storage unit using prefabricated pressure containment vessels.

Figure 1:
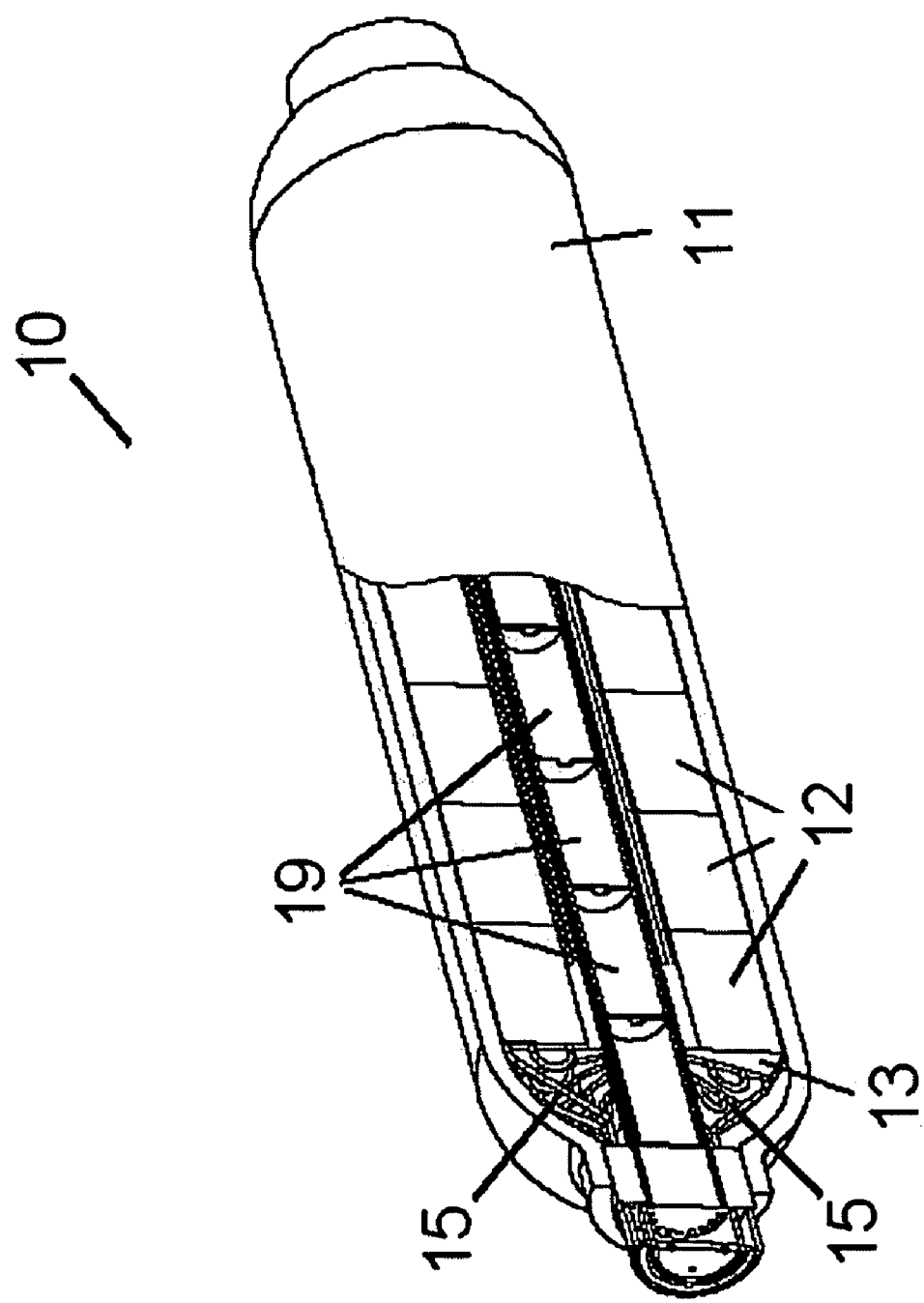
FIG. 1, is a depiction of an embodiment of the hydrogen storage unit in accordance with the present invention.
Figure 2:
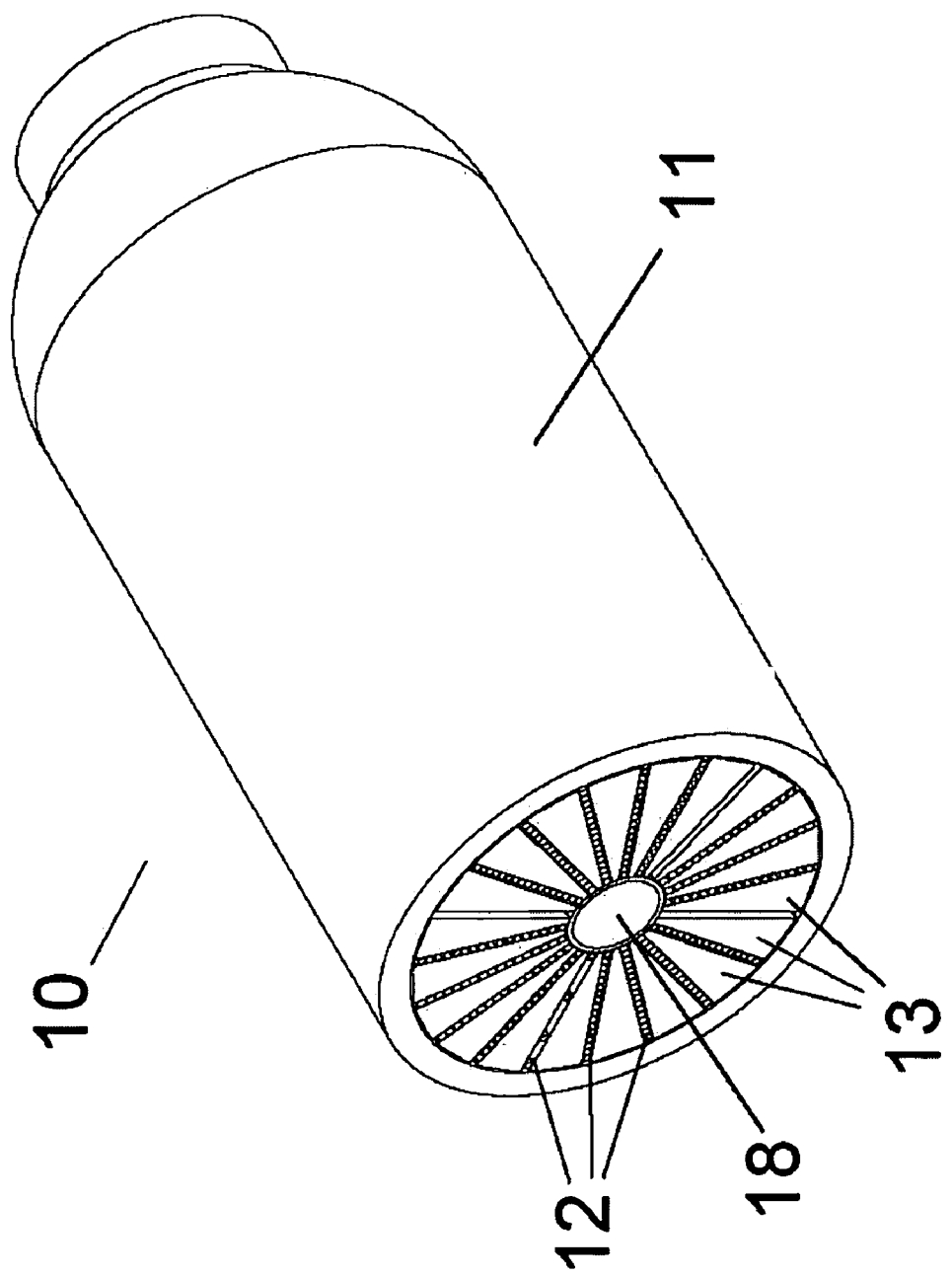
FIG. 2, is a cross-sectional view of the embodiment of the present invention depicted in FIG. 1.

An embodiment of the hydrogen storage unit in accordance with the present invention is depicted in FIG. 1. A cross-sectional view of the embodiment of the present invention depicted in FIG. 1 is depicted in FIG. 2. The hydrogen storage unit 10 in accordance with the present invention generally comprises a pressure containment vessel 11 having a longitudinal axis and a plurality of cells 14 at least partially filled with a hydrogen storage material. The plurality of cells 14 are preferably radially disposed about the longitudinal axis of the pressure containment vessel. At least a portion of the plurality of cells 14 may be arranged into a plurality of primary modular blocks 13 radially disposed about the longitudinal axis of the pressure containment vessel. The hydrogen storage unit 10 may further comprise a plurality of fins 12, whereby each of the plurality of blocks 13 is disposed between two of the plurality of fins 12. The hydrogen storage unit 10 may include one or more heat exchanger tubes 15 disposed within the pressure containment vessel 11 for heating or cooling the hydrogen storage material contained within the cells of the hydrogen storage unit 10.

The pressure containment vessel 11 may be any vessel capable of containing a pressurized gas. The pressure containment vessel may be formed of low carbon steel, stainless steel, or aluminum. Preferably, the pressure containment vessel is from of low carbon A106B, which has negligible reactivity with the hydrogen stored within the pressure containment vessel, thus avoiding embrittlement of the pressure containment vessel during repeated cycling. The pressure containment vessel preferably has a cylindrical shape with a longitudinal axis. Preferably, the pressure containment vessel is seamless. The pressure containment vessel has a first opening at one end through which hydrogen enters and exits the pressure containment vessel. A heat transfer fluid may also enter and exit the heat exchanger tubes disposed inside the pressure containment vessel through the first opening. The pressure containment vessel may have a second opening on the end opposite the first opening such that hydrogen enters and exits the pressure containment vessel through the first opening and the heat transfer fluid enters and exits the heat exchanger tubes disposed inside the pressure containment vessel through the second opening. The first and second openings of the pressure containment vessel preferably have a diameter less than or equal to 50% of the interior diameter of the pressure containment vessel as required by the codes and standards of The American Society of Mechanical Engineers for pressure containment vessels. To provide the vessel with additional strength for high pressure operation, a fiber reinforced composite material such as glass or carbon fiber may be wound around the vessel to help prevent damage to the pressure containment vessel at high operating pressures.

Each of the plurality of cells 14 are at least partially filled with a hydrogen storage material which stores hydrogen in metal hydride form. The plurality of cells 14 are preferably positioned parallel to one another and are radially disposed about the longitudinal axis of the pressure containment vessel such that the top of each cell faces the interior wall of the pressure containment vessel and the bottom of each cell faces away from the interior wall of the pressure containment vessel toward the longitudinal axis of the pressure containment vessel. At least a portion of the cells may extend from an area proximate to the interior wall of the pressure containment vessel to an area proximate to the longitudinal axis of the pressure containment vessel. Each cell has an open top, an open bottom, and a cell wall. The cross-section of each cell may have a circular or polygonal configuration. The diameter of the cells is determined by the heat transfer requirements of the hydrogen storage unit. Preferably the height of each cell is greater than the diameter of the cell. The cells are preferably formed from a heat conductive material such as low carbon steel, stainless steel, copper, aluminum, or other conductive materials having negligible reactivity with the contents of the pressure containment vessel.

A porous filter material may be placed at the top and bottom of each cell to retain the hydrogen storage material within the cells. The porous filter material should be formed from a material having negligible reactivity with the stored hydrogen. Preferably, the porous filter material is a glass wool.

Figure 3:
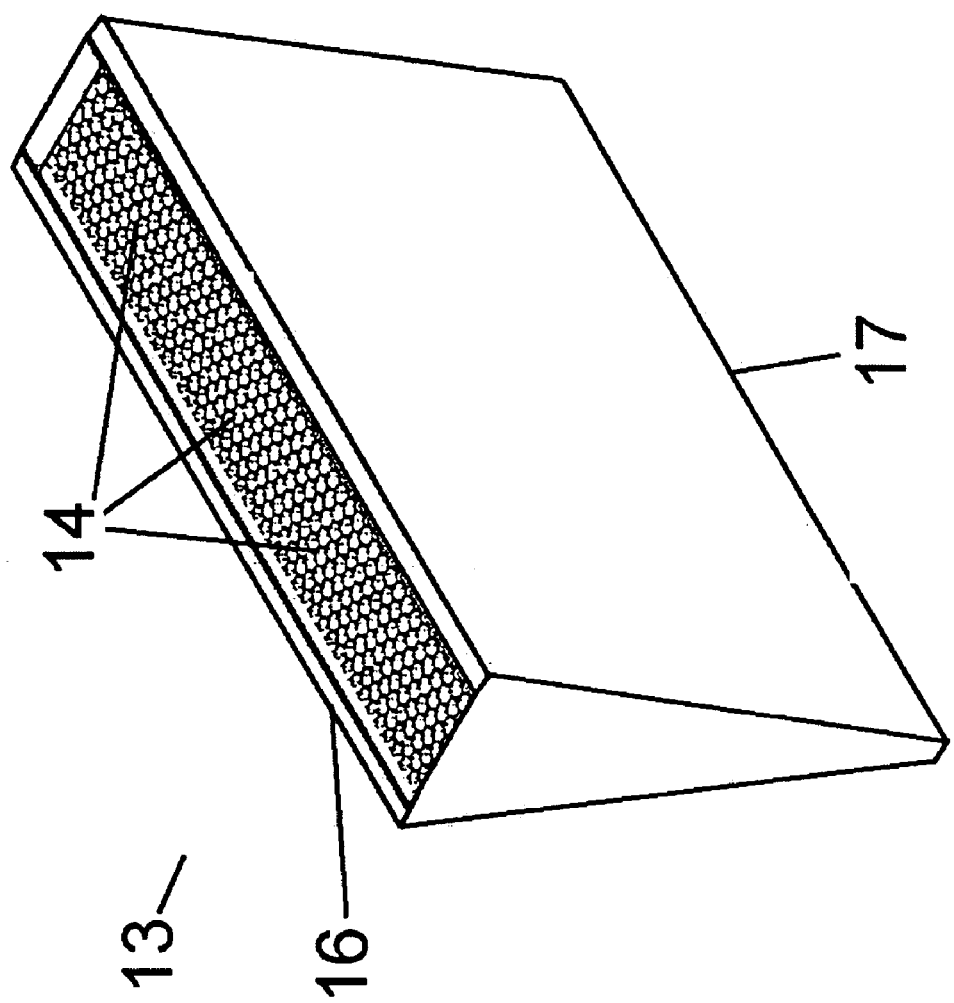
FIG. 3, is a depiction of a primary block in accordance with the present invention.

The plurality of cells 14 may be arranged into one or more primary blocks 13. Preferably, the one or more primary blocks are modular in design. The one or more primary blocks 13 may be radially disposed within the pressure containment vessel 11 about the longitudinal axis of the pressure containment vessel. A primary block 13 in accordance with the present invention is depicted in FIG. 3. The primary modular blocks may be in contact with and/or in thermal communication with the one or more fins and/or one or more heat exchanger tubes. Each primary block may be disposed between two of the plurality of fins 12. Each primary block 13 may have an open top 16 and an open bottom 17 which allows hydrogen to flow into and through the cells within each primary block. The primary blocks may have sides which may be solid or have holes allowing hydrogen to access the interior of the primary blocks. The primary blocks 13 preferably have a triangular or trapezoidal cross-section whereby the bottom of each primary block is narrower than the top of each primary block. The bottom of each primary block is preferably curved inward thereby creating a longitudinal channel about the longitudinal axis of the pressure containment vessel when the primary modular blocks are disposed in a radial manner about the longitudinal axis of the pressure containment vessel. The top of each primary block may be curved outward to better conform to the interior wall of the pressure containment vessel. The height of the primary modular blocks from top to bottom is preferably less than the diameter of the first or second opening of the pressure containment vessel thereby allowing for insertion of each of the one or more primary modular blocks into the pressure containment vessel through the first or second opening. When disposed in the pressure containment vessel, the top of each primary block is adjacent to the interior wall of the pressure containment vessel. Each of the primary modular blocks may extend the length of the interior of the pressure containment vessel or two or more primary modular blocks may be disposed adjacent to one another such that the adjacent primary modular blocks extend the length of the interior of the pressure containment vessel. The primary modular blocks are preferably constructed from a heat conductive material such as low carbon steel, stainless steel, copper, aluminum, or other conductive materials having negligible reactivity with the contents of the pressure containment vessel.

The plurality of cells and/or the primary modular blocks may be disposed within the pressure containment vessel in such a way as to form an axial channel 18 about the longitudinal axis of the pressure containment vessel. A second plurality of cells at least partially filled with a hydrogen storage material may be disposed in the axial channel 18. At least a portion of the second plurality of cells may be disposed in one or more secondary blocks 19 disposed in the axial channel 18. The second plurality of cells may be radially disposed about or parallel to the longitudinal axis of the pressure containment vessel. The one or more secondary blocks preferably have a cylindrical cross-section. Each secondary block may be formed from a plurality of radially disposed triangular or trapezoidal blocks containing at least a portion of the secondary plurality of cells. Each secondary block 19 may have an axial channel about the longitudinal axis of the cylindrical block allowing for hydrogen to flow through the pressure containment vessel. Preferably, the hydrogen storage material disposed within the axial channel has a higher packing density than the hydrogen storage material contained elsewhere in the pressure containment vessel. By providing a greater packing density for the hydrogen storage material disposed within the axial channel, the flow of hydrogen through the system may be directed toward the axial channel through mass transport. The mass transport of hydrogen within the system causes the hydrogen gas and hydrogen storage material to move toward the longitudinal axis of the pressure containment vessel away from the interior wall of the pressure containment vessel thereby reducing the stress on the interior wall of the pressure containment vessel.

The plurality of fins 12 located within the pressure containment vessel 11 compartmentalize and/or aid in heat transfer throughout the pressure containment vessel interior. The plurality of fins may be radially disposed about the longitudinal axis of the pressure containment vessel. Each of the heat fins may extend the length of the interior of the pressure containment vessel or two or more heat fins may be disposed with their edges adjacent to one another such that the adjacent fins extend throughout the length of the interior of the pressure containment vessel. The fins may be rectangular or square. The fins may be flat or have a grooved configuration. The height of the fins is preferably less than the diameter of the first or second opening of the pressure containment vessel thereby allowing insertion into the pressure containment vessel through the first or second opening. The plurality of fins are preferably constructed from a heat conductive material such as low carbon steel, stainless steel, copper, aluminum, or other conductive materials having negligible reactivity with the contents of the pressure containment vessel.

The one or more heat exchanger tubes 15 may be positioned adjacent to one or more of the fins 12 and/or one or more of the primary modular blocks 13 and/or secondary blocks 19. The heat exchanger tubes 15 and the fins 12 may be in direct contact and/or in thermal communication with each other. When using grooved fins, one or more of the heat exchanger tubes may reside within one or more of the grooves on the fins. The amount of heat exchanger tubing within the vessel is variant upon the amount of heat required to be added or removed from the vessel. The heat exchanger tubing is formed from a thermally conductive material. Preferably, the heat exchanger tubes are composed of stainless steel, copper, or aluminum. The heat exchanger tubes may be composed of other materials provided they have negligible reactivity within the system.

During operation, a heat transfer fluid flows through the heat exchanger tubes to remove heat from the hydrogen storage material to the outside environment during hydrogenation of the hydrogen storage material or add heat to the hydrogen storage material during dehydrogenation of the hydrogen storage material. The heat transfer fluid is preferably either ethylene glycol, water, or a mixture thereof, however, other liquids or gases may be used in accordance with the present invention.

When utilizing a single heat exchanger tube, the heat transfer fluid enters the vessel through a fluid inlet, enters the heat exchanger tube, and flows through the pressure containment vessel via the heat exchanger tube thereby heating or cooling the contents of the pressure containment vessel. After the fluid flows through the vessel via the heat exchanger tube, the fluid exits the pressure containment vessel through a fluid outlet.

When utilizing two or more heat exchanger tubes, the heat transfer fluid enters the vessel through a fluid inlet and flows into an inlet manifold which distributes the fluid to the two or more heat exchanger tubes within the vessel. Upon entering the two or more heat exchanger tubes, the fluid flows through the vessel via the heat exchanger tubes, thereby heating or cooling the contents of the pressure containment vessel. After the fluid flows through the pressure containment vessel via the two or more heat exchanger tubes, the fluid flows into a outlet manifold which combines the heat transfer fluid from each of the heat exchanger tubes into a single exit stream which flows out of the pressure containment vessel through a fluid outlet.

The hydrogen storage material contained within the plurality of cells may be one or more hydrogen storage alloys generally known to those in the art. Hydrogen storage alloys may be chosen from AB, $A_2B$, $A_2B_7$, $AB_2$, or $AB_5$ alloy systems, or combinations thereof. Such alloys may have a body centered cubic (BCC), face centered cubic (FCC), laves phase, C-14, or C-15 crystal structure. Examples of such alloys are Mg, Mg—Ni, Mg—Cu, Ti—Fe, Ti—Mn, Ti—Ni, Ti—V, Ti—Cr, Mm—Ni, Mm—Co alloy systems. The different hydrogen storage alloy systems provide differing characteristics such as hydrogen absorption capacity and reversibility based on temperature and pressure.

Of these materials, the Mg alloy systems can store relatively large amounts of hydrogen per unit weight of the storage material. To release the hydrogen stored within the alloy heat energy must be supplied, because of the low hydrogen dissociation equilibrium pressure of the alloy at room temperature. Moreover, release of hydrogen can be made, only at a high temperature of over 250° C. along with the consumption of large amounts of energy. Different types of magnesium based hydrogen storage alloys are fully disclosed in U.S. Pat. No. 6,193,929, to Ovshinsky et al. entitled "High Storage Capacity Alloys Enabling A Hydrogen-Based Ecosystem", the disclosure of which is hereby incorporated by reference.

The rare-earth (Misch metal) alloys typically can efficiently absorb and release hydrogen at room temperature, based on the fact that it has a hydrogen dissociation equilibrium pressure on the order of several atmospheres at room temperature. The drawbacks to rare earth alloys are that their hydrogen-storage capacity per unit weight is lower than any other hydrogen-storage materials and they are relatively expensive.

The Ti—Fe alloy system, which has been considered as a typical and superior material of the titanium alloy systems, has the advantages that it is relatively inexpensive and the hydrogen dissociation equilibrium pressure of hydrogen is several atmospheres at room temperature. However, since it requires a high temperature of about 350° C. and a high pressure of over 30 atmospheres for initial hydrogenation. Also, it has a hysteresis problem which hinders the complete release of hydrogen stored therein. The Ti—Fe alloy is also easily poisoned by moisture, which will be present within the heating pack.

The Ti—Mn alloy has excellent ambient temperature kinetics and plateau pressures. The Ti—Mn alloy system has been reported to have a high hydrogen-storage efficiency and a proper hydrogen dissociation equilibrium pressure, since it has a high affinity for hydrogen and low atomic weight to allow large amounts of hydrogen-storage per unit weight.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

The invention claimed is:

1. A metal hydride hydrogen storage unit comprising:
a pressure containment vessel having a longitudinal axis;
a plurality of cells radially disposed about said longitudinal axis inside said pressure containment vessel, said plurality of cells being at least partially filled with a hydrogen storage alloy, each of said plurality of cells having an open top, an open bottom, and a cell wall; wherein at least a portion of said plurality of cells are arranged into a plurality of primary blocks radially disposed about said longitudinal axis inside said pressure containment vessel; and further comprising a plurality of fins radially disposed about said longitudinal axis inside said pressure containment vessel, each of said fins being disposed between two of said plurality of blocks;

wherein said plurality of fins have a corrugated or grooved configuration.

2. The metal hydride hydrogen storage unit according to claim 1, wherein said plurality of primary blocks are modular.

3. The metal hydride hydrogen storage unit according to claim 1 further comprising one or more heat exchanger tubes at least partially disposed within said pressure containment vessel, said one or more heat exchanger tubes being in thermal communication with said hydrogen storage material.

4. The metal hydride hydrogen storage unit according to claim 1, wherein each of said plurality of cells have a circular configuration or a polygonal configuration.

5. The metal hydride hydrogen storage unit according to claim 1, wherein said hydrogen storage material is retained in said plurality of cells via a porous filter material disposed at the top and/or bottom of each of said plurality of cells.

6. The metal hydride hydrogen storage unit according to claim 1 further comprising an axial channel disposed about the longitudinal axis of said pressure containment vessel, wherein a plurality of secondary cells at least partially filled with said hydrogen storage alloy are disposed within said axial channel.

7. The metal hydride hydrogen storage unit according to claim 6, wherein said hydrogen storage material disposed in said axial channel has a packing density greater than the packing density of said hydrogen storage material disposed elsewhere in said pressure containment vessel.

8. The metal hydride hydrogen storage unit according to claim 6, wherein at least a portion of said second plurality of cells are disposed in one or more secondary blocks.

9. The metal hydride hydrogen storage unit according to claim 8, wherein said one or more secondary blocks are modular.

10. The metal hydride hydrogen storage unit according to claim 9, wherein said one or more secondary modular blocks have a cylindrical configuration.

11. The metal hydride hydrogen storage unit according to claim 1, wherein said pressure containment vessel is wrapped in a fiber reinforced composite material.

12. The metal hydride hydrogen storage unit according to claim 1, wherein said pressure containment vessel is prefabricated.

13. A metal hydride hydrogen storage unit comprising:
a pressure containment vessel having a longitudinal axis;
a plurality of cells radially disposed about said longitudinal axis inside said pressure containment vessel, said plurality of cells being at least partially filled with a hydrogen storage alloy, each of said plurality of cells having an open top, an open bottom, and a cell wall; and
an axial channel disposed about the longitudinal axis of said pressure containment vessel, wherein a plurality of secondary cells at least partially filled with said hydrogen storage alloy are disposed within said axial channel.

14. The metal hydride hydrogen storage unit according to claim 13, wherein said hydrogen storage material disposed in said axial channel has a packing density greater than the packing density of said hydrogen storage material disposed elsewhere in said pressure containment vessel.

15. The metal hydride hydrogen storage unit according to claim 13, wherein at least a portion of said second plurality of cells are disposed in one or more secondary blocks.

16. The metal hydride hydrogen storage unit according to claim 15, wherein said one or more secondary blocks are modular.

17. The metal hydride hydrogen storage unit according to claim 16, wherein said one or more secondary modular blocks have a cylindrical configuration.

* * * * *